United States Patent [19]

Iijima

[11] Patent Number: 4,495,241
[45] Date of Patent: Jan. 22, 1985

[54] MAGNETIC TAPE

[75] Inventor: Kenzaburo Iijima, Hamamatsu, Japan

[73] Assignee: Nippon Gakki Seizo Kabushiki Kaisha, Japan

[21] Appl. No.: 455,525

[22] Filed: Jan. 4, 1983

[30] Foreign Application Priority Data

Jan. 6, 1982 [JP] Japan .................... 57-1256

[51] Int. Cl.³ ............................................. H01F 10/02
[52] U.S. Cl. ................................... 428/328; 427/35; 427/129; 427/130; 427/131; 427/132; 428/336; 428/457; 428/694

[58] Field of Search ............... 427/132, 129, 130, 131, 427/35; 428/694, 336, 328, 457

*Primary Examiner*—Bernard D. Pianalto
*Attorney, Agent, or Firm*—Ostrolenk, Faber, Gerb & Soffen

[57] ABSTRACT

An extremely thin highly magnetic layer is formed on one surface side only of an age-hardening type magnet alloy film by local age-hardening after solution treatment for the purpose of high density recording without any process difficulties.

14 Claims, 8 Drawing Figures

MAGNETIC TAPE

BACKGROUND OF THE INVENTION

The present invention relates to a magnetic tape and a method for producing same, and more particularly relates to the production of a magnetic tape adapted for high density magnetic recording such as magnetic sound recording and magnetic video recording.

It is well known in the field of magnetic recording that a thin structure combined with large coersive force and high residual magnetic flux density of the magnetic layer of a magnetic tape is a prerequisite to high density recording, i.e. short wave recording, by the magnetic tape.

In the case of the conventional magnetic tape in which a base tape film of synthetic resin is coated with a mixture of ferromagnetic material powder with a synthetic resin binder, it is difficult to make the magnetic layer, i.e. the mixture layer, thinner than a certain limit. Further, the use of a considerable amount of the binder in the magnetic layer makes it difficult to provide a large apparent coersive force and a high residual magnetic flux density. For these reasons, the conventional coated type magnetic tapes are quite unsuited for high density recording.

In order to respond to the increasing demand for high density recording, it has already been proposed, as a substitute for the conventional coated type magnetic film, to use a ferromagnet alloy film for the magnetic tape for high density recording. As such ferromagnet alloys, age-hardening type magnet alloys such as Alnico type magnets and Fe-Cr-Co type magnets have received much recognition because of their large coersive force and high residual magnetic flux density.

One process for producing such a magnet alloy film includes rolling of a cast ingot. In this case, however, the alloys have to be chosen only from a group suited for rolling. Extremely high workability is required for the material in order to laminate the material down to a film of several micronmeters by rolling. Even when the lamination is achieved successfully by rolling, there remains difficulty with subsequent thermal process such as age-hardening and solution treatment.

For production of the film of the above-described type, it is also proposed to blow molten magnet alloy onto a quench roll rotating at a high speed in order to form a film on the surface of the quench roll. In this case, however, it is almost impossible to form a film of uniform thickness at the level of several micronmeters suited for high density recording. Further, although this process removes the need for solution treatment, it still necessitates the subsequent age-hardening which is difficult to practice after the alloy has been extremely laminated to the level of several micronmeters. Therefore, although use of the age-hardening type magnet alloy enables production of an extremely laminated magnetic tape with large coersive force and high residual magnetic flux density, it is next to impossible to reduce the thickness of the magnetic tape beyond a certain limit because of difficulty in heat treatment. This naturally forms a limit to high density recording.

It was also proposed to form a thin layer of a magnetic material on a synthetic resin base film by plating or vacuum evaporation. This process enables an appreciable degree of lamination of the magnetic material. However, since the magnetic layer is formed on the base film made of synthetic resin, it is difficult to carry out the subsequent heat treatments smoothly. As a consequence, this process is unsuited for age-hardening type magnet alloys.

SUMMARY OF THE INVENTION

It is the object of the present invention to enable production of magnetic tapes from age-hardening type magnet alloys which is ideally suited for high density recording.

In accordance with one aspect of the present invention, a magnetic tape is comprised of a base layer subjected to solution treatment only and a ferromagnetic surface layer of 0.1 to 2 micronmeters thickness subjected to age-hardening after the solution treatment.

In accordance with the other aspect of the present invention, an age-hardening type magnetic material is laminated to an extremely thin film which is then subjected to solution treatment, and one surface of the thin film is heated for age-hardening while cooling the other surface.

DESCRIPTION OF THE PREFERRED EMBODIMENT

The age-hardening type magnet alloy materials are of a type which cause precipitation of ferromagnetic particles after age-hardening and subsequent to solution treatment. Typically, spinodal decomposition type magnet alloy materials are used for this purpose. Such spinodal decomposition type magnet alloy materials include Alnico type magnets, Fe-Cr-Co type magnets, Pt-Co type magnets (typically including 50 atomic % of Pt), An-Fe-Co type magnets and Cu-Ni-Fe type magnets. Any of these magnet alloy materials are well usable for the purposes of the present invention.

In production of the magnetic tape in accordance with the present invention, a block of the age-hardening type magnetic alloy material of the above-described type is first laminated to an extremely thin film by any known manner. For example, a cast ingot may be subjected to rolling. The thickness of the thin film should preferably be in a range from 2 to 50 mironmeters. When the thickness falls short of 2 micronmeters, the thin film is unsuited for the solution treatment. When the thickness surpasses 50 micronmeters, the too thick structure of the tape connects to low recording density per one roll of film.

The thin film is then subjected to a solution treatment. The temperature to be employed in this treatment should properly fixed in accordance with the material chosen. For example, a temperature in a range from 800° to 1200° C. is preferably used with Fe-Cr-Co type magnet alloys. This solution treatment is carried out over the entire thickness of the thin film.

Next, only one surface of the thin film is subjected to age-hardening. More specifically, one surface of the thin film is heated by, for example, electron beam heating while cooling the other surface.

Figure 1:
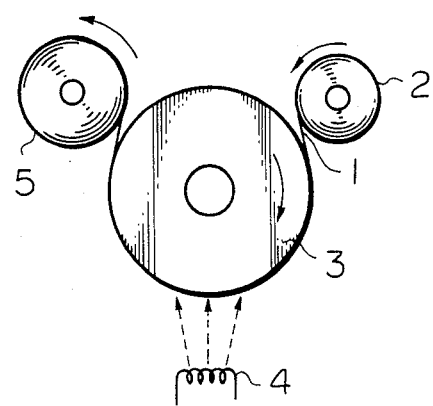
FIG. 1 is a side view of an age-hardening equipment used for production of the magnetic tape in accordance with the present invention.

One example of the age-hardening equipment is shown in FIG. 1, in which a thin film 1 already subjected to the solution treatment is continuously taken out from a supply reel 2 to a take-up reel 5 while traveling in surface contact with the periphery of an intermediate water-cooling drum 3. The surface of the film 1 not in contact with the water-cooling drum 5 is heated by an electron beam generator 4 located facing the periphery of the water-cooling drum 5.

Figure 2:
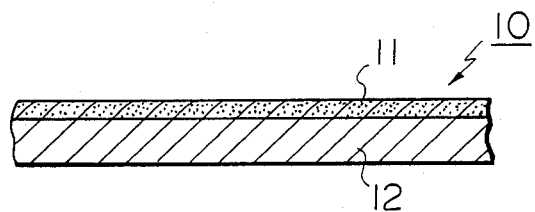
FIGS. 2 and 3 are transverse sectional view of magnetic tapes in accordance with the present invention.
Figure 3:
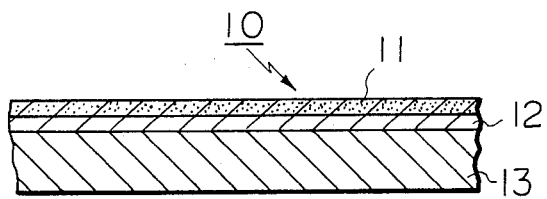

The cross sectional structure of the magnetic tape 1' obtained after the age-hardening is illustrated in FIG. 2, in which the magnetic tape 10 is made up of a ferromagnetic surface layer 11 which was subjected to age-hardening after solution treatment and includes ferromagnetic particles, and a non or little magnetic base layer 12 which was subjected to solution treatment only and does not include any percipitated ferromagnetic particles.

The thickness of the ferromagnetic layer should preferably be in a range from 0.1 to 2 micronmeters. Any thickness below 0.1 micronmeters connects to insufficient characteristics as a magnetic tape such as deficient information output. Whereas if the thickness exceeds 2 micronmeters, the magnetic tape becomes unsuited for short wave recording thereby disenabling satisfactory high density recording.

The thickness of the ferromagnetic surface layer 11 can be freely changed by adjusting the heating conditions during the age-hardening. In the case of the arrangement shown in FIG. 1, adjustment of the output from the electron beam generator 4 and/or the traveling speed of the film 1 causes corresponding changes in the depth of the age-hardening, i.e. the thickness of the ferromagnetic surface layer.

The magnetic film 10 after age-hardening is adapted for direct use in recording without adding other treatments. Thin structure of the ferromagnetic surface layer 11 may result in low mechanical strength of the magnetic tape 10. In such a case, a film 13 made of synthetic resin such as polyester may be bonded to the base layer 13 for fortification purposes.

As described already, the ferromagnetic surface layer includes ferromagnetic particles percipitated by age-hardening. Regarding the dispersion and shape of these ferromagnetic particles, the following conditions should preferably be sufficed.

First, the volume occupation rate of the ferromagnetic particles should preferably be in a range 15 to 80%. Here, the term "volume occupation rate" is mathematically defined as $V_1/(V_1+V_2)$, where $V_1$ is the total volume of the ferromagnetic particles in the age-hardened layer and $V_2$ is the entire volume of the non ferromagnetic substance in the layer.

Figure 4:
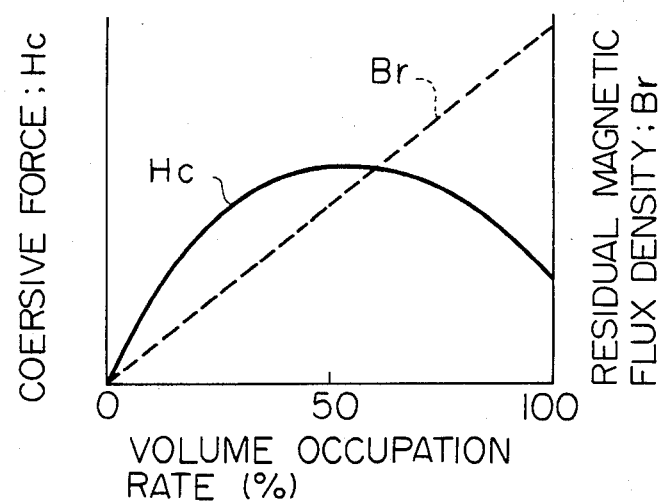
FIG. 4 is a graph showing the relationship between the volume occupation rate of the ferromagnetic particles in the ferromagnetic surface layer and the coersive force and residual magnetic flux density of a magnetic tape including such a surface layer.

The relationship between this volume occupation ratio of the ferromagnetic particles in the ferromagnetic surface layer and the residual magnetic flux density (Br) and the coersive force (Hc) of the magnetic tape including such a surface layer is graphically shown in FIG. 4. Any volume occupation ratios lower than 15% connect to low residual magnetic flux density and small coersive force and the resultant magnetic tape is unsuited for magnetic recording. In the case of the Fe-Cr-Co type magnet alloy used in the Example, the residual magnetic flux density is lower than 2T and the coersive force is smaller than 16000 A/m if the volume occupation ratio falls short of 15%. On the contrary, if the volume occupation ratio exceeds 80%, the percipitated magnetic particles are bonded each other and the coersive force is reduced undesirably. For example, in the case of the Fe-Cr-Co type magnet alloy used in the Example, the coersive force becomes smaller than 24000 A/m.

Figure 5:
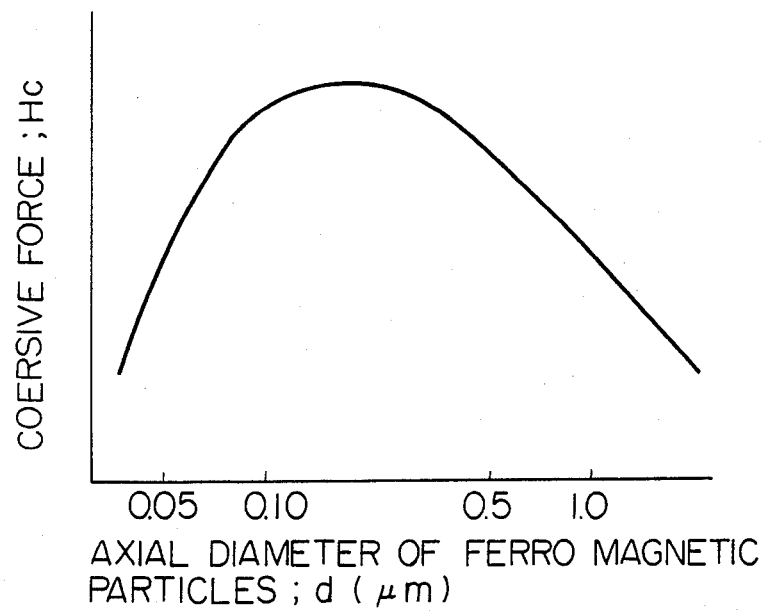
FIG. 5 is a graph showing the relationship between the axial diameter of the ferromagnetic particles in the ferromagnetic surface layer and the coersive force of a magnetic tape including such a surface layer.

Second, the axial diameter (short diameter) of the ferromagnetic particle in the ferromagnetic surface layer should preferably be in a range from 0.05 to 1 micronmeter. The relationship between the axial diameter (d) of the magnetic particles and the coersive force (Hc) of the magnetic tape including the magnetic particles in the surface layer is graphically shown in FIG. 5, which clearly indicates that the resultant coersive force is dwindled away to values unsuited for a magnetic tape when the axial diameter falls outside the above-described range. For Example, in the case of the Fe-Cr-Co magnetic alloy used for the Example, the resultant coersive force becomes smaller than 16000 A/m.

Figure 6:
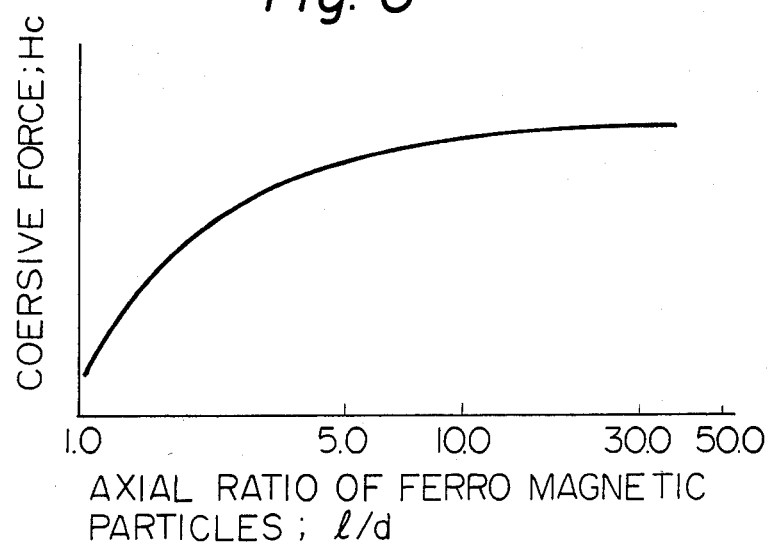
FIG. 6 is a graph showing the relationship between the axial ratio of the ferromagnetic particles in the ferromagnetic surface layer and the coersive force of a magnetic tape including such a surface layer.

Thirdly, the axial ratio of the ferromagnetic particles in the surface layer should preferably be 3.0 or larger. Here, the term "axial ratio" refers to the ratio of the axial length (l) with respect to the diameter (d) of the ferro-magnetic particle. The relationship between the axial ratio (l/d) of the ferromagnetic particles and the coersive force (Hc) of the magnetic tape including such particles in the surface layer is graphically shown in FIG. 6, which indicates that any axial ratios smaller than 3.0 connect to the demagnetizing factor of the particles. The coersive force is reduced to values unsuited for a magnetic tape.

Figure 7:
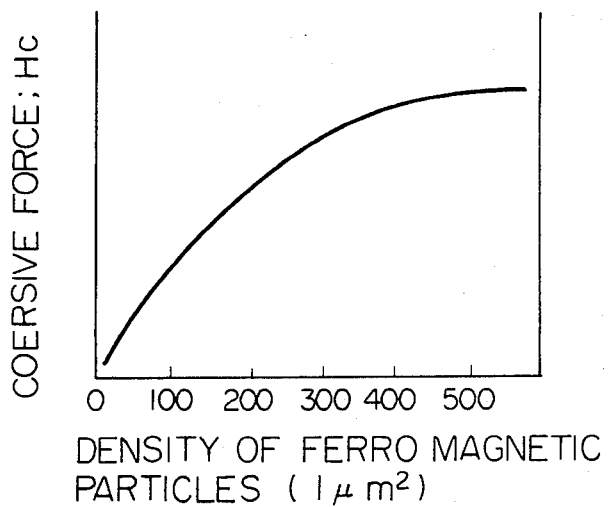
FIG. 7 is a graph showing the relationship between the density of the ferromagnetic particles in the ferromagnetic layer and the coersive force of a magnetic tape including such a surface layer.

Fourthly, the density of the ferromagnetic particles in the ferromagnetic surface layer should preferably be larger than $200/\mu m^2$. Here, the term "density" refers to the number of ferromagnetic particles per unit surface area of the ferromagnetic surface layer. The relationship between the density of the ferromagnetic particles in the ferromagnetic surface layer and the coersive force of the magnetic tape including such a surface layer is graphically shown in FIG. 7. It is clearly learned from the illustration that any density smaller than $200/\mu m^2$ results in the value of the coersive force unsuited for a magnetic tape. For example, in the case of the Fe-Cr-Co magnet alloy used for the Example, the resultant coersive force becomes smaller than 24000 A/m.

EXAMPLE

An Fe-Cr-Co type alloy including 44% by weight of Fe, 31% by weight of Cr and 25% by weight of Co was subjected to rolling to produce a thin film of 5.0 micronmeters thickness. In a vacuum emvironment, the thin film was heated at 1000° C. for 1 Hr for solution treatment. Next, the film was processed on the equipment shown in FIG. 1 placed in a vacuum container for age-hardening in order to obtain magnetic tapes shown in FIG. 2. Electric power applied to the electron beam generator was changed from 1.5 to 6 kW in order to vary the thickness of the ferromagnetic surface layer. The traveling speed of the tape was set to 10 m/sec and the width of the tape was 100 mm.

Regarding each magnetic tape so obtained, magnetic characteristics and output characteristics on a video deck of 3 m/sec head speed were measured.

For comparison purposes, similar measurements was carried out on a $\gamma$-$Fe_2O_3$ magnetic tape coated with Co (Sample G). The results of the measurements are shown in the following table and the output characteristics are graphically shown in FIG. 8. Symbols A to G in FIG. 8 correspond to similar sample identifications in the table.

| Sample identification | Electron beam output power(kW) | Thickness of ferromagnetic surface layer($\mu$m) | Magnetic characteristics Br[T] | Hc[A/m] | Output voltage at 4 MHz (mV) |
|---|---|---|---|---|---|
| A | 1.5 | 0.05 | 0.50 | 48,000 | 65 |
| B | 2.0 | 0.1 | 0.75 | 64,000 | 135 |
| C | 2.5 | 0.5 | 0.76 | 65,600 | 205 |
| D | 4.0 | 1.5 | 0.75 | 72,800 | 240 |
| E | 5.0 | 2.0 | 0.75 | 72,000 | 220 |
| F | 6.0 | 3.0 | 0.75 | 72,000 | 50 |
| G | $\gamma$-$Fe_2O_3$ coated with $C_o$ | | 0.15 | 52,000 | 80 |

Figure 8:
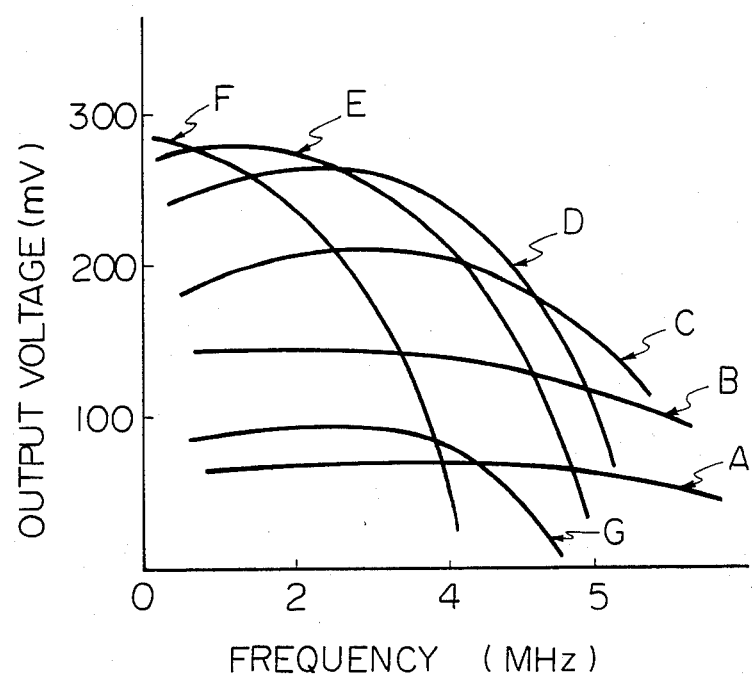
FIG. 8 is a graph showing the output characteristics of the samples used in the example of the present invention.

It is clear from the experimental outcome shown in FIG. 8 that the thinner the ferromagnetic layer, the more the extension of the output voltage into the high frequency range but the lower the output level. In contrast to this, the thicker the ferromagnetic layer, the higher the output level but the worse the frequency characteristics. In particular, the output level is remarkably lowered as the thickness of the ferromagnetic layer falls short of 0.1 micronmeters (Sample A). When the thickness of the ferromagnetic layer exceeds 2 micronmeters (Sample F), the frequency characteristics are considerably deteriorated to an extent unsuited for high density recording. As long as the thickness of the ferromagnetic surface layer remains within the range from 0.1 to 2 micronmeters (Samples B, C, D and E), the frequency characteristics and output level are both better than those of the $\gamma$-$Fe_2O_3$ tape coated with Co (Sample G).

In accordance with the present invention, use of age-hardening type magnet alloy material assures production of a magnetic tape with large coersive force and high residual magnetic flux density. The extremely thin structure of the ferromagnetic surface layer enables magnetic recording with higher density than those by the conventional magnetic tapes. Further, in accordance with the process of the present invention, it is not required to make the whole structure of the magnetic tape thin enough to enable high density recording. Only the surface layer has to be made extremely thin. As a consequence, choice of the material can be extended to those which are not specially excellent in ductility.

I claim:

1. Magnetic tape comprising a base layer formed by solution treatment of an age-hardening type magnet alloy material and a ferromagnetic surface layer which is formed on one surface side of said base layer by age-hardening of said magnet alloy material and has a thickness in a range from 0.1 to 2 micronmeters.

2. Magnetic tape as claimed in claim 1 in which the volume occupation ratio of ferromagnetic particles in said ferromagnetic surface layer is in a range from 15 to 80%.

3. Magnetic tape as claimed in claim 1 in which the axial diameter of ferromagnetic particles in said ferromagnetic surface layer is in a range from 0.05 to 1 micronmeters.

4. Magnetic tape as claimed in claim 1 in which the axial ratio of ferromagnetic particles in said ferromagnetic surface layer is 3.0 or larger.

5. Magnetic tape as claimed in claim 1 in which the density of ferromagnetic particles in said ferromagnetic surface layer is 200/$\mu m^2$ or larger.

6. Magnetic tape as claimed in claim 1 in which said age-hardening type magnet alloy material is selected from a group consisting of Alnico type magnet alloys, Fe-Cr-Co type magnet alloys, Cu-Ni-Fe type magnet alloys, Pt-Co type magnet alloys and Au-Fe-Co type magnet alloys.

7. Magnetic tape as claimed in claim 6 in which the volume occupation ratio of ferromagnetic particles in said ferromagnetic surface layer is in a range from 15 to 80%, the axial diameter of said particles in said surface layer is in a range from 0.05 to 1 micronmeters, the axial ratio of said particles in said surface layer is at least 3.0 and the density of said particles in said surface layer ist at least 200/$\mu m^2$.

8. Magnetic tape as claimed in claim 7 in which said age-hardening type magnet alloy material is an Fe-Cr-Co type alloy containing 44% by weight of iron, 31% by weight of chromium and 25% by weight of cobalt.

9. Magnetic tape comprising a solution treated age-hardening type magnet alloy material having on one surface side an age hardening formed ferromagnetic surface layer of 0.1 to 2 micronmeters in thickness.

10. Magnetic tape as claimed in claim 9 in which the volume occupation ratio of ferromagnetic particles in said ferromagnetic surface layer is in a range from 15 to 80%.

11. Magnetic tape as claimed in claim 9 in which the axial diameter of ferromagnetic particles in said ferromagnetic surface layer is in a range from 0.05 to 1 micronmeters.

12. Magnetic tape as claimed in claim 9 in which the axial ratio of ferromagnetic particles in said ferromagnetic surface layer is 3.0 or larger.

13. Magnetic tape as claimed in claim 9 in which the volume occupation ratio of ferromgnetic particles in said ferromagnetic surface layer is in a range from 15 to 80%, the axial diameter of said particles in said surface layer is in a range from 0.05 to 1 micronmeters, the axial ratio of said particles in said surface layer is at least 3.0 and the density of said particles in said surface layer is at least 200/$\mu m^2$.

14. Magnetic tape as claimed in claim 13 in which said age-hardening type magnet alloy material is an Fe-Cr-Co type alloy containing 44% by weight of iron, 31% by weight of chromium and 25% by weight of cobalt.

* * * * *